(12) United States Patent
Furgerson et al.

(10) Patent No.: US 11,349,555 B2
(45) Date of Patent: May 31, 2022

(54) STAGED SEARCH RADIO DIRECTION FINDING

(71) Applicant: Raytheon Company, Waltham, MA (US)

(72) Inventors: James Furgerson, Dallas, TX (US); William P. Harokopus, McKinney, TX (US); Patrick W. Cunningham, Fairview, TX (US); John Clancy, Allen, TX (US)

(73) Assignee: Raytheon Company, Waltham, MA (US)

( * ) Notice: Subject to any disclaimer, the term of this patent is extended or adjusted under 35 U.S.C. 154(b) by 79 days.

(21) Appl. No.: 17/022,028

(22) Filed: Sep. 15, 2020

(65) Prior Publication Data

US 2022/0085865 A1    Mar. 17, 2022

(51) Int. Cl.
*H04B 1/00*      (2006.01)
*H04B 7/08*      (2006.01)
*H04B 7/0456*    (2017.01)
*H01Q 3/26*      (2006.01)
*H01Q 3/28*      (2006.01)
*H04B 1/16*      (2006.01)

(52) U.S. Cl.
CPC ......... *H04B 7/0897* (2013.01); *H01Q 3/2605* (2013.01); *H01Q 3/28* (2013.01); *H04B 1/163* (2013.01); *H04B 7/0478* (2013.01)

(58) Field of Classification Search
CPC .... H04B 7/0897; H04B 1/163; H04B 7/0478; H01Q 3/2605; H01Q 3/28
USPC ................................ 375/148, 219, 295, 316
See application file for complete search history.

(56) References Cited

U.S. PATENT DOCUMENTS

| | | |
|---|---|---|
| 5,610,612 A | 3/1997 | Piper |
| 6,127,974 A | 10/2000 | Kesler |
| 2019/0064308 A1* | 2/2019 | Erad ....................... G01S 3/043 |

* cited by examiner

*Primary Examiner* — Zewdu A Kassa

(57) ABSTRACT

A technology is described for direction finding. An example of the technology can include executing stages of an N stage search for a direction finding estimate of a plane wave X. The stages of the N stage search include searching a search space in a calibration set having a plurality of points in space and calculating a direction finding estimate, wherein a first search space is a coarse set of points in space and subsequent search spaces selected for subsequent stages of the N stage search are increasingly finer sets of points in the space, and a solution for the direction finding estimate output by a stage of the N stage search is used to select a next search space for a next stage of the N stage search. A direction finding estimate output by a final stage of the N stage search is the final direction finding estimate.

20 Claims, 4 Drawing Sheets

STAGED SEARCH RADIO DIRECTION FINDING

BACKGROUND

Direction finding (DF), or radio direction finding (RDF), is the measurement of the direction from which a received signal was transmitted. This can refer to radio or other forms of wireless communication, including radar signals detection and monitoring (ELINT/ESM). Direction finding uses one or more antennas (i.e., an antenna array) which are directional (more sensitive in certain directions than in others). A radio direction finder (RDF) is a device for finding the direction, or bearing, to a radio source. An RDF can be used to determine the location of an unknown transmitter using two or more measurements from different locations. RDF is widely used as a radio navigation system, especially with boats and aircraft. RDF systems can be used with any radio source, although the size of the receiver antennas are a function of the wavelength of the signal, such that very long wavelengths (low frequencies) require very large antennas, and are generally used only on ground-based systems. These wavelengths are nevertheless very useful for marine navigation as they can travel very long distances, which is valuable for ships when the line-of-sight may be only a few tens of kilometers. For aircraft, where the horizon at altitude may extend to hundreds of kilometers, higher frequencies can be used, allowing much smaller antennas.

BRIEF DESCRIPTION OF THE DRAWINGS

Features and advantages of the disclosure will be apparent from the detailed description which follows, taken in conjunction with the accompanying drawings, which together illustrate; by way of example, features of the disclosure; and, wherein.

Figure 1:
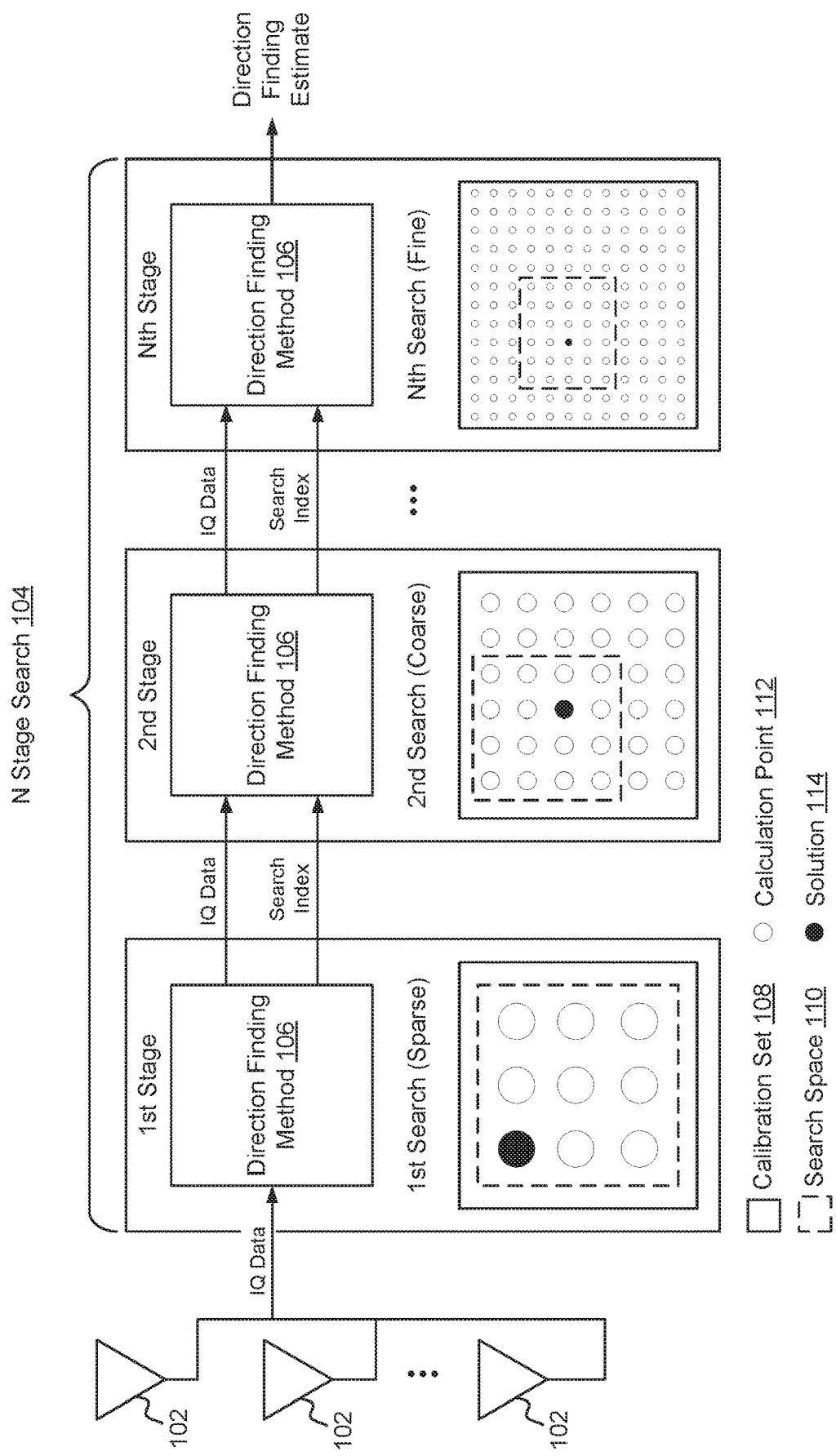
FIG. 1 is a diagram illustrating an N stage search of calculation points in a calibration set to obtain a direction finding estimate, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

An initial overview of technology embodiments is provided below and then 2.0 specific technology embodiments are described in further detail later. This initial summary is intended to aid readers in understanding the technology more quickly but is not intended to identify key features or essential features of the technology nor is it intended to limit the scope of the claimed subject matter.

Technologies are described for direction finding systems, devices, and methods that perform an N stage search of a calibration set to find a direction of a signal. Illustratively, a direction finding system can include a number of antennas (i.e., an antenna array) having a plurality of wave-receiving elements or ports, each being adapted to generate complex voltage signals representative of an amplitude, phase, and polarization of a plane wave emitted from an emitter source. The system can further include a computing device that executes a plurality of stages of an N stage search to determine a direction of the plane wave, Each stage of the N stage search searches a portion of a calibration set having points in space for a direction of the plane wave represented by the complex voltage signals received from the antennas. The first stage of the N stage search starts with a sparse or coarse search space of points and searches the points for a direction finding estimate. The solution (i.e., the direction finding estimate) output by the first stage is provided to a second stage of the N stage search, and the second stage uses the solution to identify a next search space that is finer (less coarse) than the preceding search space. For example, the next search space can have a higher density of points in proximity to the solution output by the preceding stage as compared to the number of points in the preceding search space. Accordingly, each subsequent search space can be refined to be a smaller search space with a higher density of points. After identifying the next search space, the second stage searches points in the next search space for a direction finding estimate. This process can be repeated for an N number of stages (e.g., 2 or more stages) to further narrow the direction of the plane wave, and a direction finding estimate output by a final stage of the N stage search can be presented as the direction of the plane wave.

In one example, the present disclosure sets forth a system comprising: an antenna having a plurality of wave-receiving elements, each being adapted to generate complex voltage signals representative of an amplitude, phase, and polarization of a plane wave X from an emitter; at least one processor; and a memory device including instructions that, when executed by the at least one processor, cause the direction finding system to: execute stages of an N stage search for a direction finding estimate of the plane wave X based on the complex voltage signals, wherein the stages of the N stage search: select a search space in a calibration set having a plurality of points in space, determine a direction of the plane wave X in the search space by calculating performance index values for the plurality of points in the search space, minimize the performance index values, and identify a performance index value for a point in the search space that has a minimum value, wherein a first search space is a coarse set of points in space and subsequent search spaces selected for subsequent stages of the N stage search are increasingly finer sets of points in the space, and a solution for the direction finding estimate output by a stage of the N stage search is used to identify a next search space for a next stage of the N stage search; and output the direction finding estimate for the plane wave X output by a final stage of the N stage search.

In an example, the memory device further includes instructions that, when executed by the at least one processor, cause the system to select the first search space using linear spacing of the plurality of points in the calibration set.

In an example, the memory device further includes instructions that, when executed by the at least one processor, cause the system to: create a difference matrix to include the plurality of points in the calibration set; identify a point in the difference matrix that is most different as compared to other points in the difference matrix; and select the first search space that includes the point identified in the difference matrix.

In an example, the calibration set is based in part on a direction finding error parameter.

In an example, a number of points included in the calibration set is based in part on a number of wave-receiving elements included in the antenna.

In an example, the N stage search comprises a fixed number of stages that is based in part on an amount of computing resources allocated to generating the direction finding estimate.

In an example; the instructions that determine the direction of the plane wave X in the search space, when executed by the at least one processor, further cause the system to perform the steps of:

Step 1
$$F(\theta, \emptyset) = \frac{\text{Min}}{X} \|M(\theta, \emptyset)X - V\|^2, \forall X \in C^2$$
Step 2
$$\frac{Minimize}{\theta, \emptyset} F(\theta, \emptyset) \Rightarrow (\theta_s, \emptyset_s)$$

wherein

V is a fixed vector of complex voltage signals received from the antenna, and MX is port induced synthesized voltages by the plane wave X, and Step 1 defines the plane wave X and the port induced synthesized voltages that most closely match V at the direction and can be stated as a best plane wave $X_b$, in terms of a pseudo-inverse of M $$X_b(\theta, \emptyset) = (\overline{M}^t M)^{-1} \overline{M}^t V,$$

and

Step 2 determines a direction in space for which the port synthesized voltages and measured voltages most closely match and is the direction finding estimate output by a stage of the N stage search.

In an example, the instructions that determine the direction of the plane wave X in the search space, when executed by the at least one processor, further cause the system to perform the step of:

computing a residual error R as a measure of whether the direction finding estimate is correct by $$R_e(\theta, \emptyset) = MX_b - V = M(\overline{M}^t M)^{-1} \overline{M}^t V - V;$$

defining a norm of a residual error vector as the performance index $$\|\cdot\|:C^n \rightarrow R_1 \text{ norm}$$

and $$\frac{Minimize}{\theta, \emptyset} \|R_e(\theta, \emptyset)\| \Rightarrow (\theta_s, \emptyset_s).$$

In an example, the memory device further includes instructions that, when executed by the at least one processor, cause the system to minimize the performance index by an iterative optimizer routine comprising one of: a minimum of all points, simplex method, conjugate gradients, or Fletcher-Powell.

In an example, the antenna is: an r-lobe monopulse antenna, a phase interferometer, an amplitude-phase interferometer, or a multi-arm spiral antenna.

In an example, the system further comprises a low noise amplifier communicating with antenna elements and adapted to amplify the complex voltage signals, a mixer communicating with the low noise amplifier and adapted to down convert the amplified complex voltage signals to an intermediate frequency, a channelized receiver communicating with the mixer and adapted to subdivide frequency bands and produce a plurality of output signals with manageable small bandwidths for analog to digital conversion, and an analog to digital converter receiving each output signal from the channelized receiver and supplying digitized voltage signals to the at least one processor.

The present disclosure also sets forth a computer implemented method for direction finding, comprising: receiving complex voltage signals from at least one antenna; executing stages of an N stage search for a direction finding estimate of a plane wave X represented by the complex voltage signals; wherein the stages of the N stage search include: (i) selecting a search space in a calibration set having a plurality of points in space, wherein a first search space is a coarse set of points in space and subsequent search spaces selected for subsequent stages of the N stage search are increasingly finer sets of points in the space, and a solution for the direction finding estimate output by a stage of the N stage search is used to identify a next search space for a next stage of the N stage search, and (ii) performing the steps of:

Step 1
$$F(\theta, \emptyset) = \frac{\text{Min}}{X} \|M(\theta, \emptyset)X - V\|^2, \forall X \in C^2$$
Step 2
$$\frac{Minimize}{\theta, \emptyset} F(\theta, \emptyset) \Rightarrow (\theta_s, \emptyset_s)$$

wherein

V is a fixed vector of the complex voltage signals received from the at least one antenna, and MX is port induced synthesized voltages by a plane wave X, and Step 1 defines the plane wave X and the induced synthesized voltages that most closely match V at the direction and can be stated as a best plane wave $X_b$ in terms of a pseudo-inverse of M $$X_b(\theta, \emptyset) = (\overline{M}^t M)^{-1} \overline{M}^t V, \text{ and}$$

Step 2 determines a direction in space for which the synthesized voltages and measured voltages most closely match and is the direction finding estimate output by the stage; and outputting the direction finding estimate generated by a last stage of the N stage search.

In an example, the computer implemented method further comprises identifying the next search space for the next stage of the N stage search using the direction finding estimate output by an immediately preceding stage of the N stage search, wherein the next search space includes a greater number of points as compared to a number of points in a preceding search space, and the next search space includes points that are in proximity to the point in the preceding search space associated with the solution to the direction finding estimate output by the preceding stage of the N stage search.

In an example, the computer implemented method further comprises creating the calibration set to include a number of points based in part on a number of wave-receiving elements included in the at least one antenna, and the number of points to be spaced according to a direction finding error parameter.

In an example, the computer implemented method further comprises computing a residual error R as a measure of whether the direction finding estimate is correct by defining a norm of a residual error vector as the performance index.

The present disclosure also sets forth a non-transitory machine readable storage medium having instructions embodied thereon, the instructions when executed by one or more processors: execute stages of an N stage search for a direction finding estimate of a plane wave X, wherein the stages of the N stage search: select a search space in a calibration set having a plurality of points in space, determine a direction of the plane wave X in the search space by calculating performance index values for the plurality of points in the search space, minimize the performance index values, and identify a performance index value for a point in the search space that has a minimum value, compute a residual error R as a measure of whether the direction finding estimate is correct by defining a norm of a residual error vector as the performance index, wherein a first search space is a coarse set of points in space and subsequent search spaces selected for subsequent stages of the N stage search are increasingly finer sets of points in the space, and a solution for the direction finding estimate output by a stage of the N stage search is used to select a next search space for a next stage of the N stage search; and output the direction finding estimate for the plane wave X output by a final stage of the N stage search.

In an example, the instructions, when executed by the one or more processors, further receive the complex voltage data from a plurality of antennas.

In an example, the instructions, when executed by the one or more processors, further pass the solution for the direction finding estimate output by a first stage of the N stage search to a second stage of the N stage search to allow the second stage to use the solution as a search index to define a second search space.

In an example, the non-transitory machine readable storage medium is a field-programmable gate array (FPGA) which is programmed to execute the stages of the N stage search.

Prior direction finding technologies are computationally intensive and result in low throughput in resource constrained systems. For example, the prior technologies produced an angle of arrival by minimizing a performance index over an entire search space of a multidimensional calibration set. This approach consumes a large amount of computing resources and may not produce sufficient data throughput. The present technology improves direction finding by using an N stage search to search a subset of a calibration set for an angle of arrival. Namely, the N stage search starts with a course search of points in a search space and progressively refines the search space until a solution is found. Staging the searches using increasingly finer sets of search spaces is a more efficient use of computing resources and increases throughput (e.g., via fewer computation cycles) as compared to searching across every point of a multidimensional calibration set. More specifically, the N stage search eliminates the need to search every point in a calibration set, and as a result, reduces the number of computation cycles and computing resources needed to generate a direction finding estimate.

To further describe the present technology, examples are now provided with reference to the figures. FIG. 1 is a diagram illustrating an N stage search 104 of calculation points 112 (also simply referred to as "point" or "points") in a calibration set 108 for a direction finding estimate. A calibration set 108 can comprise a plurality of multidimensional points in space representing directions from which a signal can arrive at an antenna 102. The calibration set 108 can be combined with complex voltage signals (quadrature signal (IQ) data) received from the antenna 102, and the points of IQ data in the calibration set 108 can be searched using an N stage search 104 for a direction finding estimate (or angle of arrival (AoA) estimate) for the signal.

The calibration set 108 may be created for use in a direction finding system. The calibration set 108 can be created to meet a direction finding or AoA error parameter. As an illustration where the direction finding error is 1° (one degree), the points in space in the calibration set 108 can be spaced by 2° (two degrees) across the calibration set 108 to provide for a maximum error in a 2° by 2° space of 1°. The size of a calibration set 108 may be dependent on a number of antennas 102 included in the direction finding system.

As mentioned, IQ data received from an antenna 102 can be combined with a calibration set 108, and stages of an N stage search 104 can be executed to search the calculation points 112 in increasingly finer search spaces 110 of the calibration set 108 for a direction finding estimate. The N stage search 104 can include two or more stages, where the first stage starts with a sparsely populated search space 110 of the calibration set 108, and subsequent stages search increasingly refined search spaces 110 of the calibration set 108, such that the refined search spaces 110 include a denser or greater population of calculation points 112 as compared to the search spaces 110 in prior stages of the N stage search 104. Thus, as illustrated in FIG. 1, a first stage may include a sparse calibration set 108, a second stage may include a coarse calibration set 108, and an Nth stage may include a fine calibration set 108. The coarseness of a search space 110 for each stage can be determined by the direction finding accuracy of an antenna 102. For example, in the case of a "well behaved" antenna 102 (e.g., consistent and reliable), the search space 110 for each stage can be more coarse (i.e., include a sparser population of calculation points 112) as compared to a search space 110 used in association with a "poorly behaved" antenna 102 (e.g., less consistent and reliable).

As an illustration of the N stage search 104, the first stage can search a sparse search space 110 of a calibration set 108 using a direction finding method 106 (described below), and the first stage can output a solution 114 that is passed to a second stage of the N stage search 104, along with the IQ data. The solution 114 output by the first stage provides the second stage with a search index (e.g., an angle space—x degrees phi and x degrees theta) indicating where next to search in the calibration set 108. For example, the search index can be used by the second stage to define a next search space 110. Further, the next search space 110 of the calibration set 108 can contain a denser population of calculation points 112 as compared to the sparsely populated search space 110 used in the first stage of the N stage search 104. This process can be repeated in additional stages to reduce the search space 110 of the calibration set 108 until a final stage outputs a final direction finding estimate.

The number of stages included in an N stage search 104 can be based on various factors, including an amount of computing resources that are available to execute the N stage search 104, an amount of time in which to execute the N stage search 104, and/or the type of application that utilizes a direction finding estimate produced by the N stage search 104. For example, a number of calculation points 112 in a calibration set 108 used in a stage of the N stage search 104 correlates to the amount of time and computing resources needed to execute the stage of the N stage search 104. As such, a decision whether to execute an additional stage of the N stage search 104 with a calibration set 108 having a higher density of calculation points 112 can be based on the amount of time and/or computing resources available to execute the additional stage. Accordingly, the number of stages in an N stage search 104 can be fixed (e.g., 2, 3, 4, or more stages) based on one or more of these factors. In another example, the number of stages of the N stage search 104 can be dynamic. As one example, the number of stages can be dynamically determined based on a variable amount of allocated computing resources and/or variable amount of allowed execution time.

As described earlier, each stage of the N stage search 104 executes a direction finding method 106. The direction finding method 106 uses complex information from each of a plurality of antenna elements/ports. The direction finding method 106 uses a characterization of beams in space and complex measurements of the beams in space for two independent polarizations. In one example, the direction finding method 106 determines a direction of a plane wave X in a search space 110 by calculating performance index values for the calculation points 112 contained in the search space 110. The method 106 then minimizes the performance index values for the calculation points 112 and identifies a performance index value for a calculation point 112 that has a minimum value. For example, the direction finding method 106 can perform the following computations:

Step 1
$$F(\theta, \phi) = \frac{\text{Min}}{X} \|M(\theta, \phi)X - V\|^2, \forall X \in C^2$$

Step 2
$$\frac{\text{Minimize}}{\theta, \phi} F(\theta, \phi) \Rightarrow (\theta_s, \phi_s)$$

wherein

V is the fixed received vector of complex voltages,

MX is the port induced voltages (synthesized) by the plane wave X,

Step 1 defines the plane wave and induced voltages that best match the received vector V at the direction and can be stated as a best plane wave, $X_b$, in terms of the pseudo-inverse of M $$X_b(\theta, \phi) = (\overline{M}^t M)^{-1} \overline{M}^t V,$$

and

Step 2 determines the direction in space for which the synthesized voltages and measured voltages are best matched and is a direction finding estimate. The residual error $R_e$ is computed as a measure of whether the chosen direction is the correct direction by $$R_e(\theta, \phi) = MX_b - V = M(\overline{M}^t M)^{-1} \overline{M}^t V - V;$$

The norm of the residual error vector is defined as the performance index $$\|\cdot\|: C^n \to R, \text{ norm}$$

$$\|R_e\| = \text{Performance Index}$$

and the performance index is minimized:

$$\frac{\text{Minimize}}{\theta, \phi} \|R_e(\theta, \phi)\| \Rightarrow (\theta_s, \phi_s).$$

In one example, the direction finding method 106 minimizes the performance index using an iterative optimizer routine, such as, but not limited to: a minimum of all points routine, a simplex method, a conjugate gradients routine, or a Fletcher-Powell routine. As described earlier, the output of the direction finding method 106 can be passed (e.g., as a parameter or argument) to a next stage of the N stage search 104, or, in the case of a final stage the N stage search 104, the output can be provided as a final direction finding estimate.

Figure 2:
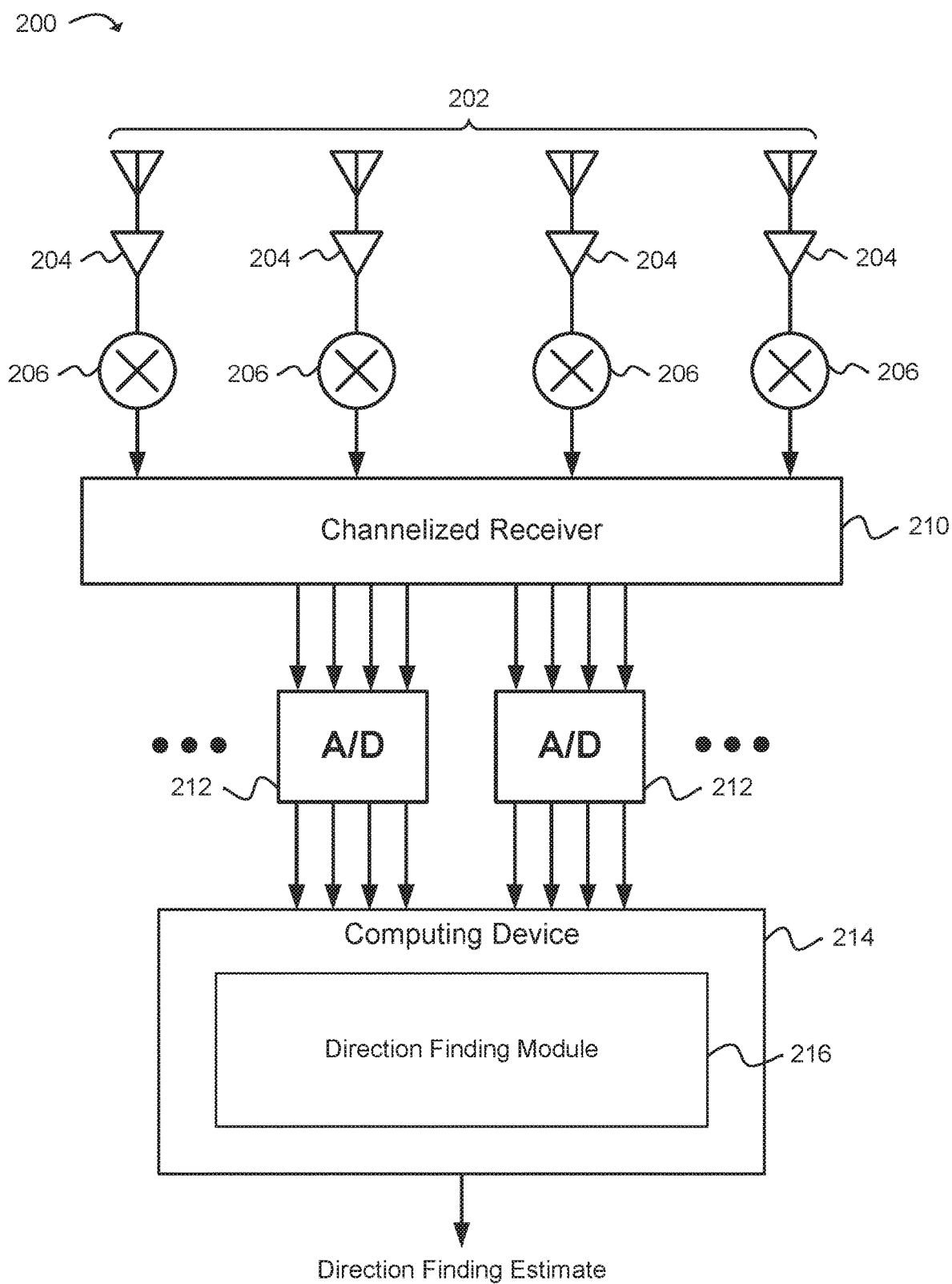
FIG. 2 is a block diagram illustrating an example direction finding system, in accordance with an example.

FIG. 2 is a block diagram illustrating an example direction finding system 200. The exemplary direction finding system 200 in FIG. 2 shows a channelized direction finding system that includes a multi-aperture/element antenna 202 with polarization diversities. Complex antenna patterns are known for two polarizations which allows characterization for all polarizations. The antenna 202 can be an r-lobe monopulse, a phase interferometer, an amplitude-phase interferometer, a multi-arm spiral, or another appropriate type of antenna 202. In an exemplary implementation of the direction finding system 200, a low noise amplifier 204 receives voltage signals from each antenna element and supplies amplified signals to a mixer 206, which down converts the low noise amplified voltage signals to an intermediate frequency. A channelized receiver 210 receives the intermediate frequency signals and subdivides them into frequency bands with manageable small bandwidths for analog to digital conversion. An analog to digital converter 212 receives each output signal from the channelized receiver 210 and supplies digitized voltage signals to a computing device 214 configured to execute a direction finding module 216. An example computing device 214 is described in greater detail later in association with FIG. 4. In one example, the direction finding module 216 can be a non-transitory machine readable storage medium (e.g., read only memory (ROM) or flash memory random access memory (RAM)) having stored instructions that when executed by one or more processors perform the direction finding method 106 described in association with FIG. 1.

As an example, output from the antenna 202 passes through a low noise amplifier 204 and a mixer 206 to down convert the signal for an intermediate frequency (IF). The IF signals are conducted to the channelized receiver 210 which subdivides the frequency bands so that the output is manageable with sufficiently small bandwidth that the analog to digital converters 212 can handle the throughput. The processed digital outputs from each antenna element (at a given frequency) are sent to the computing device 214 to execute the direction finding module 216 to find the estimate for the direction of arrival of the emitter source. Accordingly, hardware and software can be designed to provide real-time direction finding, which can be used for direction control.

The antenna system can be linear. The general direction finding problem can be considered as a four dimensional problem, two angles and two polarizations. As such, the direction finding problem can be nonlinear in the two angle variables and the two polarization variables. However, it is time consuming to search the four-dimension space for the solution to the nonlinear problem. The direction finding method 106 described herein casts the problem in a six-dimensional space in order to formulate the problem in a linear format. With respect to plane waves, plane waves propagate in a given direction and can be represented by two complex numbers. For example, a plane wave propagating in the z direction can be represented as:

$$\vec{E} = (u_1 * \hat{e}_1 + u_2 * \hat{e}_2) e^{-jkz}; u_1, u_2 \in C: \hat{e}_1 * \hat{z} = \hat{e}_2 * \hat{z} = 0 \quad (1)$$

The complex variables $u_1$ and $u_{12}$ contain the amplitude, phase and the polarization of the plane wave with respect to the complex linearly independent basis vectors, $\hat{e}_1$ and $\hat{e}_2$ of unit norm. Two examples of this are linear and circular polarization basis vectors. For the linear case, $\hat{e}_1 = \hat{x}$, and $\hat{e}_2 = \hat{y}$. And for the circular polarization case $\hat{e}_1 = (\hat{x} - j\hat{y})/\sqrt{2}$, and $\hat{e}_2 = (\hat{x} - j\hat{y})/\sqrt{2}$. With respect to fixed basis vectors, $X = [u_1, u_2]^t \in C^2$ (plane wave space at a specific angle) represents plane waves propagating in the $\hat{z}$ direction. Given an antenna with N ports, the plane wave induces a complex voltage at each of the ports, $v = [v_1, v_2 \ldots v_n]^t$, This process can be represented by an N by 2 matrix, M, that maps plane waves into port voltages. The first and second columns of M are respectively the pattern port voltages with respect to the two polarization basis vectors, $\hat{e}_1$ and $\hat{e}_2$.

$$M: C^2 \to C^n, MX = V \quad (2)$$

A row of M gives the pattern values of the two polarizations for the antenna port. Since M is a linear transformation of the C vector space, the image in C is a linear subspace of dimension less than or equal to two (e.g., each antenna response lies in this subspace). Thus, an arbitrary choice of port voltages may not be possible; rather the port voltages that lie in the image subspace can be chosen. However, if errors occur in the received antenna channels, then the received signal vector may not lie in the image space of M. The direction finding method can be defined as the two step process:

Step 1
$$F(\theta, \emptyset) = \frac{\text{Min}}{X} \|M(\theta, \emptyset) X - V\|^2, \forall X \in C \quad (3)$$

Step 2
$$\frac{Minimize}{\theta, \emptyset} F(\theta, \emptyset) \Rightarrow (\theta_s, \emptyset_s)$$

where V is the fixed received vector of complex voltages. At a specific direction in space, MX is the port induced voltages (synthesized) by the plane wave X. Step 1 defines the plane wave and induced voltages that best match the received vector V at the specific direction. Step 2 finds the direction in space for which the synthesized voltages and the measured voltages are best matched. This best direction is the direction finding estimate to the problem.

Step 1 is solved based upon a linear problem formulation. The best plane wave, X, at the specific direction can be defined in terms of the pseudo-inverse of M.

$$X_b(\theta, \emptyset) = (\overline{M}^t M)^{-1} \overline{M}^t V \quad (4)$$

Recall that M is a function of theta and phi, whereas V is not. The residual error in solving the linear problem is a measure whether the chosen direction is the correct direction.

$$R_e(\theta, \emptyset) = MX_b - V = M(\overline{M}^t M)^{-1} \overline{M}^t V - V \quad (5)$$

The norm of the residual error vector can be defined as the performance index.

$$\|\cdot\|: C^n \to R, \text{ norm}$$

$$\|R_e\| = \text{Performance Index} \quad (6)$$

The performance index is a non-negative real valued function of the direction in space, Minimization of the performance index is Step 2.

$$\frac{Minimize}{\theta, \emptyset} \|R_e(\theta, \emptyset)\| \Rightarrow (\theta_s, \emptyset_s) \quad (7)$$

If there are no errors in the received voltages from the emitter, then there is at least one direction in which the residual error, and hence the performance index, is zero. There may be more than one solution, which causes ambiguities in the direction finding. In the case of no errors in the received voltages and more than one solution, this ambiguity situation may be caused by the antenna configuration being used. That is, when there is a direction finding ambiguity, there are two direction and two plane waves that induce the same voltages at the ports. The receiver has no way to resolve the direction finding ambiguity since all of the available information has been used. To resolve the ambiguity, the antenna configuration can be changed. An additional antenna may be added (e.g., a guard antenna), or the configuration changed so that the set of antenna patterns do not result in the ambiguous situation.

Figure 3:
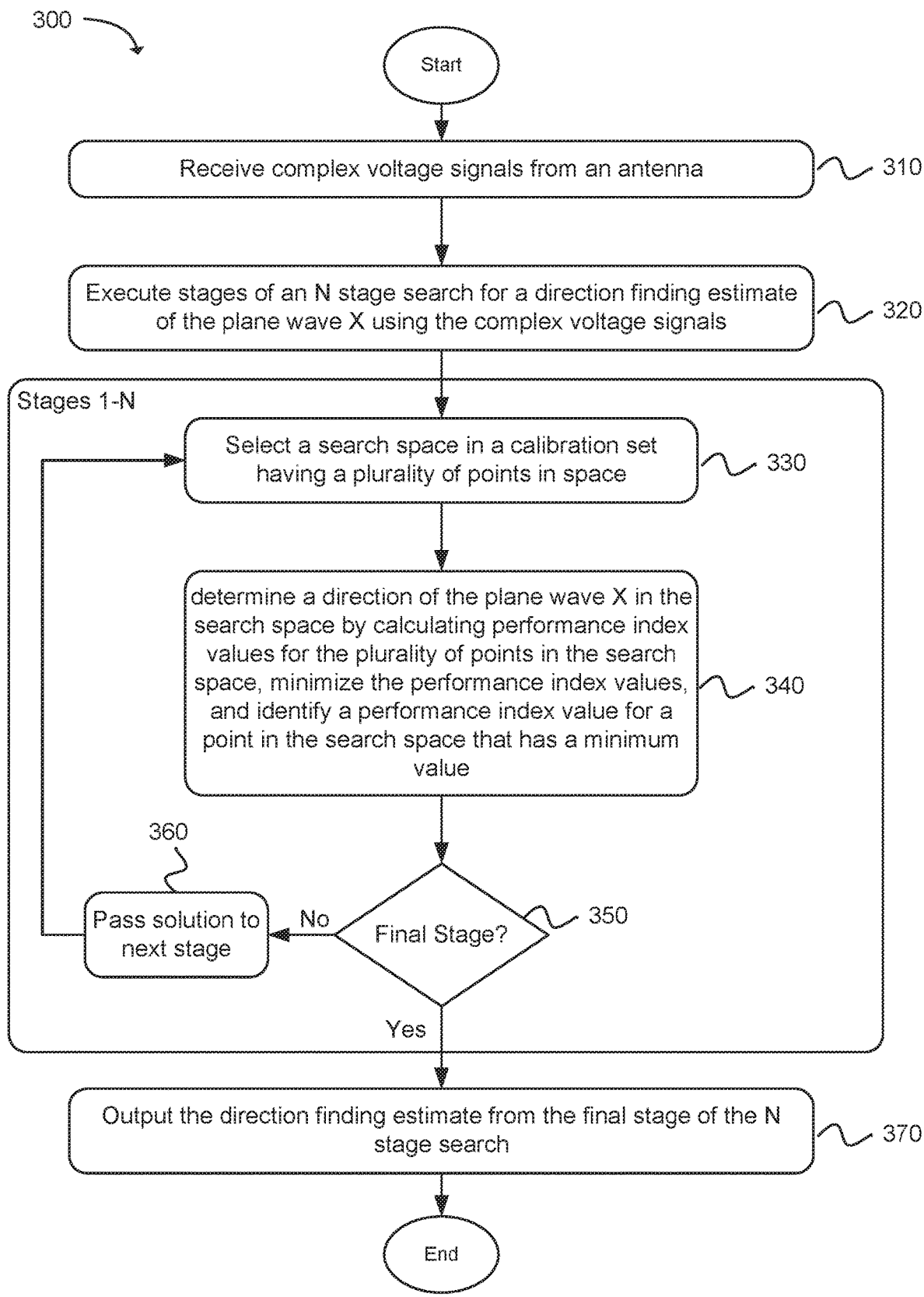
FIG. 3 is a flow diagram illustrating an example method for direction finding using an N stage search, in accordance with an example.

FIG. 3 is a flow diagram illustrating an example method 300 for direction finding using an N stage search. Starting in block 310, complex voltage signals can be received from an antenna. In one example, the antenna has a plurality of wave-receiving elements, each being adapted to generate the complex voltage signals representative of an amplitude, phase, and polarization of a plane wave X from an emitter.

As in block 312, stages of the N stage search can be executed for a direction finding estimate of the plane wave X using the complex voltage signals. The N stage search can include two or more stages. In one example, the number of stages in the N stage search may be a fixed number of stages, which can be based in part on an amount of computing resources allocated to generating the direction finding estimate, or based in part on an amount of time allocated to generating the direction finding estimate.

A stage of the N stage search can include, selecting a search space in a calibration set having a plurality of points in space, as in block 330, and determining a direction of the plane wave X in the search space by calculating performance index values for the plurality of points in the search space, minimizing the performance index values, and identifying a performance index value for a point in the search space that has a minimum value, as in block 340. In one example, a residual error R can be computed as a measure of whether the direction finding estimate is correct by defining a norm of a residual error vector as the performance index. The calibration set, in one example, can be created based in part on a direction finding error parameter, and the number of points included in the calibration set can be based in part on a number of wave-receiving elements included in an antenna.

In one example, the first search space can be selected using linear spacing of the plurality of points in the calibration set. In another example, a difference matrix can be created to include the plurality of points in the calibration set. Thereafter, a point in the difference matrix that is most different as compared to other points in the difference matrix can be identified, and the first search space that includes the point identified in the difference matrix can be selected as the first search space.

The first search space can be a coarse set of points in space, and subsequent search spaces selected for subsequent stages of the N stage search can be increasingly finer sets of points in the space. A solution for the direction finding estimate output by a stage of the N stage search can be used to identify a next search space for a next stage of the N stage search. For example, a direction finding estimate output by a first stage of the N stage search can be passed to a second stage of the N stage search, and the second stage can use the direction finding estimate to define a next search space. The next search space can include a denser number of points as compared to a number of points included in the preceding search space, and the next search space can include points which are in proximity to the point in the preceding search space associated with the direction finding estimate output by the preceding stage of the N stage search. For example, an angle space comprising X degrees phi and X degrees theta can be used to define the next search space.

As in block 350, in the case that a stage of the N stage search is not a final stage (i.e., the last stage of the N stage search), then the direction finding solution output by the stage can be passed to the next stage of the N stage search, as in block 360. In the case that a stage is the final stage of the N stage search, then as in block 370, the direction finding estimate for the plane wave X generated by the final stage can be output.

Figure 4:
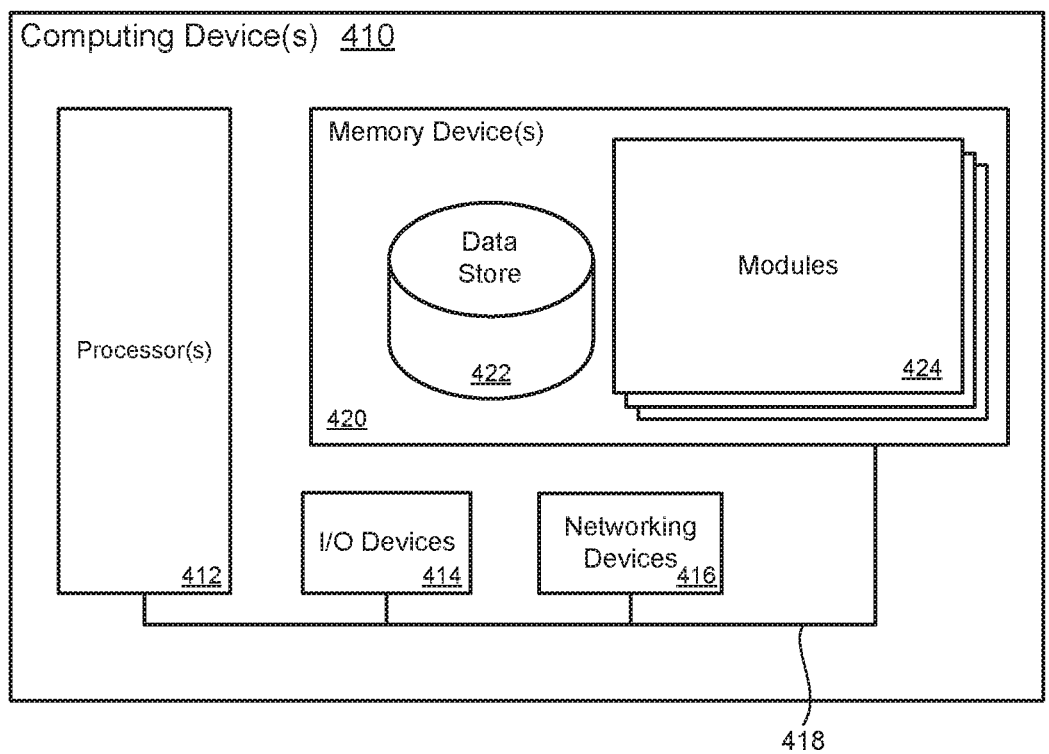
FIG. 4 is block diagram illustrating an example of a computing device that may be used to execute a direction finding method, in accordance with an example.

FIG. 4 illustrates a computing device 410 on which modules of this technology can execute. The computing device 410 illustrated is a high-level example of a device on which the present technology can be executed. The computing device 410 can include one or more processors 412 that are in communication with one or more memory devices 420. In one example, the computing device 410 can be a field-programmable gate array (FPGA) which is programmed to execute the direction finding method described herein. The computing device 410 can include a local communication interface 418 for the components in the computing device 410. For example, the local communication interface 418 can be a local data bus and/or any related address or control busses as may be desired.

The memory device 420 can contain modules 424 that are executable by the processor(s) 412 and data for the modules 424. In one example, the memory device 420 can include a direction finding module and other modules. The modules 424 can execute the functions described earlier. A data store 422 can also be located in the memory device 420 for storing data related to the modules 424 and other applications along with an operating system that is executable by the processor(s) 412.

Other applications can also be stored in the memory device 420 and may be executable by the processor(s) 412. Components or modules discussed in this description that can be implemented in the form of software using high-level programming languages that are compiled, interpreted, or executed using a hybrid of the methods described herein.

In some examples, the computing device 410 can have access to I/O (input/output) devices 414 that are usable by the computing device 410 to communicate with other computing devices (e.g., send a direction finding estimate over a network to another computing device). Networking devices 416 and similar communication devices can be included in the computing device 410. The networking devices 416 can be wired or wireless networking devices that connect to the internet, a LAN, WAN, or other computing network.

The components or modules that are shown as being stored in the memory device 420 can be executed by the processor(s) 412. The term "executable" can mean a program file that is in a form that can be executed by a processor 412. For example, a program in a higher level language can be compiled into machine code in a format that can be loaded into a random access portion of the memory device 420 and executed by the processor 412, or source code can be loaded by another executable program and interpreted to generate instructions in a random access portion of the memory to be executed by a processor. The executable program can be stored in any portion or component of the memory device 420. For example, the memory device 420 can be random access memory (RAM), read only memory (ROM), flash memory, a solid state drive, memory card, a hard drive, or any other type of memory component.

The processor 412 can represent multiple processors and the memory device 420 can represent multiple memory units that operate in parallel to the processing circuits. This can provide parallel processing channels for the processes and data in the system. The local communication interface 418 can be used as a network to facilitate communication between any of the multiple processors and multiple memories. The local communication interface 418 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data, Computer readable storage media include, but is not limited to, a non-transitory machine readable storage medium, such as RAM, ROM, EEPROM, flash memory or other memory technology, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared, and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A direction finding system, comprising:
an antenna having a plurality of wave-receiving elements, each being adapted to generate complex voltage signals representative of an amplitude, phase, and polarization of a plane wave X from an emitter;
at least one processor; and
a memory device including instructions that, when executed by the at least one processor, cause the direction finding system to:
execute stages of an N stage search for a direction finding estimate of the plane wave X based on the complex voltage signals, wherein the stages of the N stage search select a search space in a calibration set having a plurality of points in space, and determine a direction of the plane wave X in the search space by calculating performance index values for the plurality of points in the search space, minimize the performance index values, and identify a performance index value for a point in the search space that has a minimum value, wherein a first search space is a coarse set of points in space and subsequent search spaces selected for subsequent stages of the N stage search are increasingly finer sets of points in the space, and a solution for the direction finding estimate output by a stage of the N stage search is used to identify a next search space for a next stage of the N stage search; and
output the direction finding estimate for the plane wave X output by a final stage of the N stage search.

2. The direction finding system in claim 1, wherein the memory device further includes instructions that, when executed by the at least one processor, cause the system to:
receive the direction finding estimate output by a preceding stage of the N stage search; and
identify the next search space for the next stage of the N stage search using the direction finding estimate, wherein the next search space includes a denser number of points as compared to a number of points in a preceding search space, and the next search space includes points that are in proximity to the point in the preceding search space associated with the solution to the direction finding estimate output by the preceding stage of the N stage search.

3. The direction finding system in claim 1, wherein the memory device further includes instructions that, when executed by the at least one processor, cause the system to select the first search space using linear spacing of the plurality of points in the calibration set.

4. The direction finding system in claim 1, wherein the memory device further includes instructions that, when executed by the at least one processor, cause the system to:
create a difference matrix to include the plurality of points in the calibration set;
identify a point in the difference matrix that is most different as compared to other points in the difference matrix; and
select the first search space that includes the point identified in the difference matrix.

5. The direction finding system in claim 1, wherein the calibration set is based in part on a direction finding error parameter.

6. The direction finding system in claim 1, wherein a number of points included in the calibration set is based in part on a number of wave-receiving elements included in the antenna.

7. The direction finding system in claim 1, wherein the N stage search comprises a fixed number of stages that is based in part on an amount of computing resources allocated to generating the direction finding estimate.

8. The direction finding system in claim 1, wherein the instructions that determine the direction of the plane wave X in the search space, when executed by the at least one processor, further cause the system to perform the steps of:

Step 1
$$F(\theta, \phi) = \frac{\text{Min}}{X} \|M(\theta, \phi)X - V\|^2, \forall X \in C^2$$

Step 2
$$\frac{Minimize}{\theta, \phi} F(\theta, \phi) \Rightarrow (\theta_s, \phi_s)$$

wherein
V is a fixed vector of complex voltage signals received from the antenna, and MX is port induced synthesized voltages by the plane wave X, and Step 1 defines the plane wave X and the port induced synthesized voltages that most closely match V at the direction and can be stated as a best plane wave $X_b$ in terms of a pseudo-inverse of M $$X_b(\theta, \phi) = (\overline{M}^t M)^{-1} \overline{M}^t V,$$

and
Step 2 determines a direction in space for which the port synthesized voltages and measured voltages most closely match and is the direction finding estimate output by a stage of the N stage search.

9. The direction finding system in claim 8, wherein the instructions that determine the direction of the plane wave X in the search space, when executed by the at least one processor, further cause the system to perform the step of:
computing a residual error R as a measure of whether the direction finding estimate is correct by $$R_e(\theta, \phi) = MX_b - V = M(\overline{M}^t M)^{-1} \overline{M}^t V - V;$$

defining a norm of a residual error vector as the performance index $$\|\cdot\|: C^n \to R_1 \text{ norm}$$

$$\|R_e\| = \text{Performance Index},$$

and $$\frac{Minimize}{\theta, \phi} \|R_e(\theta, \phi)\| \Rightarrow (\theta_s, \phi_s).$$

10. The direction finding system in claim 1, wherein the memory device further includes instructions that, when executed by the at least one processor, cause the system to minimize the performance index by an iterative optimizer routine comprising one of: a minimum of all points, simplex method, conjugate gradients, or Fletcher-Powell.

11. The direction finding system in claim 1, wherein the antenna is: an r-lobe monopulse antenna, a phase interferometer, an amplitude-phase interferometer, or a multi-arm spiral antenna.

12. The direction finding system in claim 1, further comprising a low noise amplifier communicating with antenna elements and adapted to amplify the complex voltage signals, a mixer communicating with the low noise amplifier and adapted to down convert the amplified complex voltage signals to an intermediate frequency, a channelized receiver communicating with the mixer and adapted to subdivide frequency bands and produce a plurality of output signals with manageable small bandwidths for analog to digital conversion, and an analog to digital converter receiving each output signal from the channelized receiver and supplying digitized voltage signals to the at least one processor.

13. A computer implemented method for direction finding, comprising:
receiving complex voltage signals from at least one antenna;
executing stages of an N stage search for a direction finding estimate of a plane wave X represented by the complex voltage signals, wherein the stages of the N stage search include:
(i) selecting a search space in a calibration set having a plurality of points in space, wherein a first search space is a coarse set of points in space and subsequent search spaces selected for subsequent stages of the N stage search are increasingly finer sets of points in the space, and a solution for the direction finding estimate output by a stage of the N stage search is used to identify a next search space for a next stage of the N stage search, and
(ii) performing the steps of:

Step 1
$$F(\theta, \phi) = \frac{\text{Min}}{X} \|M(\theta, \phi)X - V\|^2, \forall X \in C^2$$

Step 2
$$\frac{Minimize}{\theta, \phi} F(\theta, \phi) \Rightarrow (\theta_s, \phi_s)$$

wherein
V is a fixed vector of the complex voltage signals received from the at least one antenna, and MX is port induced synthesized voltages by a plane wave X, and Step 1 defines the plane wave X and the induced synthesized voltages that most closely match V at the direction and can be stated as a best plane wave $X_b$ in terms of a pseudo-inverse of M $$X_b(\theta, \phi) = (\overline{M}^t M)^{-1} \overline{M}^t V, \text{ and}$$

Step 2 determines a direction in space for which the synthesized voltages and measured voltages most closely match and is the direction finding estimate output by the stage; and
outputting the direction finding estimate generated by a last stage of the N stage search.

14. The computer implemented method as in claim 13, further comprising identifying the next search space for the next stage of the N stage search using the direction finding estimate output by an immediately preceding stage of the N stage search, wherein the next search space includes a greater number of points as compared to a number of points in a preceding search space, and the next search space includes points that are in proximity to the point in the preceding search space associated with the solution to the direction finding estimate output by the preceding stage of the N stage search.

15. The computer implemented method as in claim 13, further comprising creating the calibration set to include a number of points based in part on a number of wave-receiving elements included in the at least one antenna, and the number of points to be spaced according to a direction finding error parameter.

16. The computer implemented method as in claim 13, further comprising computing a residual error R as a measure of whether the direction finding estimate is correct by defining a norm of a residual error vector as the performance index.

17. A non-transitory machine readable storage medium having instructions embodied thereon, the instructions when executed by one or more processors:

execute stages of an N stage search for a direction finding estimate of a plane wave X, wherein the stages of the N stage search:

select a search space in a calibration set having a plurality of points in space, determine a direction of the plane wave X in the search space by calculating performance index values for the plurality of points in the search space, minimize the performance index values, and identify a performance index value for a point in the search space that has a minimum value, compute a residual error R as a measure of whether the direction finding estimate is correct by defining a norm of a residual error vector as the performance index, wherein a first search space is a coarse set of points in space and subsequent search spaces selected for subsequent stages of the N stage search are increasingly finer sets of points in the space, and a solution for the direction finding estimate output by a stage of the N stage search is used to select a next search space for a next stage of the N stage search; and output the direction finding estimate for the plane wave X output by a final stage of the N stage search.

18. The non-transitory machine readable storage medium as in claim 17, further comprising instructions, that when executed by the one or more processors receive the complex voltage data from a plurality of antennas.

19. The non-transitory machine readable storage medium as in claim 17, further comprising instructions, that when executed by the one or more processors pass the solution for the direction finding estimate output by a first stage of the N stage search to a second stage of the N stage search to allow the second stage to use the solution as a search index to define a second search space.

20. The non-transitory machine readable storage medium as in claim 17, wherein the non-transitory machine readable storage medium having the instructions embodied thereon is a field-programmable gate array (FPGA) which is programmed to execute the stages of the N stage search.

* * * * *